United States Patent
Eun et al.

Patent Number: 6,055,485
Date of Patent: Apr. 25, 2000

[54] APPARATUS AND METHOD FOR ESTIMATING REMAINING FUEL QUANTITY IN GEO (GEOSTATIONARY EARTH ORBIT) COMMUNICATION SATELLITE PROPULSION SYSTEM

[75] Inventors: Jong Won Eun, Daejeon; Ju Il Suk, Seoul, both of Rep. of Korea

[73] Assignee: Electronics and Telecommunication Research Institute, Daejeon, Rep. of Korea

[21] Appl. No.: 08/984,646

[22] Filed: Dec. 3, 1997

[30] Foreign Application Priority Data

Dec. 16, 1996 [KR] Rep. of Korea .................. 96-66255

[51] Int. Cl.$^7$ ............................................. G01F 23/22
[52] U.S. Cl. ............................ 702/50; 702/55; 340/618; 73/290 R; 73/290 V
[58] Field of Search ........................ 702/50, 55; 73/167, 73/290 R, 290 V; 340/618; 244/159

[56] References Cited

U.S. PATENT DOCUMENTS

| | | | |
|---|---|---|---|
| 4,531,405 | 7/1985 | Leister | 73/290 V |
| 4,591,117 | 5/1986 | Scott | 244/170 |
| 4,908,776 | 3/1990 | Crill et al. | 702/55 |
| 5,158,362 | 10/1992 | Brauer et al. | 73/164 |

OTHER PUBLICATIONS

Appendix A; PRO: AIAA Propulsion Design Software; pp. 173–202.

AIAA 94–2792; Error Analyses for Spacecraft Propellant Gauging Techniques; Young K. Chang; Marc B. Young; Yeon S. Chae and Han Hwangbo; Jun. 27–29, 1994; pp. 1–11.

*Primary Examiner*—Marc S. Hoff
*Assistant Examiner*—Hien Vo
*Attorney, Agent, or Firm*—Antonelli, Terry, Stout & Kraus, LLP

[57] ABSTRACT

The invention provides a software tool in a PC environment, which can be used for planing and analyzing a mission of communication satellite. Input data required for predicting and estimating the amount of fuel remaining in the satellite is automatically connected to the main program, to create the remaining fuel quantity value in the result file automatically. The invention allows the satellite operator to easily perform the computation of the remaining fuel quantity in the analysis of satellite mission, and to arrange related data.

7 Claims, 3 Drawing Sheets

APPARATUS AND METHOD FOR ESTIMATING REMAINING FUEL QUANTITY IN GEO (GEOSTATIONARY EARTH ORBIT) COMMUNICATION SATELLITE PROPULSION SYSTEM

BACKGROUND OF THE INVENTION

1. Field of the Invention

The present invention relates to a technique for monitoring, tracking and controlling a communication satellite which operates in space, specifically, to the development of a software tool for computing, in a PC environment, remaining fuel quantity in a satellite GEO (Geostationary Earth Orbit) during a mission life or in the mission planning stage.

2. Discussion of Related Art

In order to compute the amount of fuel remaining in a satellite according to satellite's orbit and altitude control scheme, a satellite operator has calculated the amount of fuel consumed, through scrutinized analyses from the point when the satellite starts to operate, using telemetered data extracted from each of function blocks (for example, orbit estimation and control block, and attitude control block) of a satellite mission analysis system and propulsion system. During this process, the operator obtains the amount of remaining fuel at a specific point of time, by repeating the calculation procedure using data of the satellite, which is continuously varied, for example, the amount of fuel consumed, satellite velocity variation, the variation in injection pressure of a thruster used for the satellite.

However, if input data is omitted once, it seriously affects the subsequent calculation of remaining fuel quantity, to make difficult tracing the cause of computational error. Accordingly, the operator has difficulty in carrying out the satellite mission analysis. Furthermore, in term of the characteristic of the calculation, the telemetered data is continuously operated on dynamic software, having connection with each other. This consumes much time for obviously arranging a great deal of data accumulated, and converting it to mission analysis and estimation information.

SUMMARY OF THE INVENTION

An object of the present invention is to provide an automated design method which executes all fuel quantity calculation steps with a one-time operation which simultaneously receive and calculate input data files, a kind of thruster, firing duration and injection pressure of the thruster, which are required to compute the amount of fuel remaining in a communication satellite a mission life or in a mission planning stage, to estimate the exact impulse, to thereby provide a satellite operator with remaining fuel quantity and change in consumed fuel quantity, from the resultant output file of the computation, under the control of each subsystem of the satellite.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention, and are incorporated in and constitute a part of this specification, illustrate embodiments of the invention and together with the description serve to explain the principles of the invention:

DETAILED DESCRIPTION OF PREFERRED EMBODIMENT

Reference will now be made in detail to the preferred embodiments of the present invention, examples of which are illustrated in the accompanying drawings.

Figure 1:
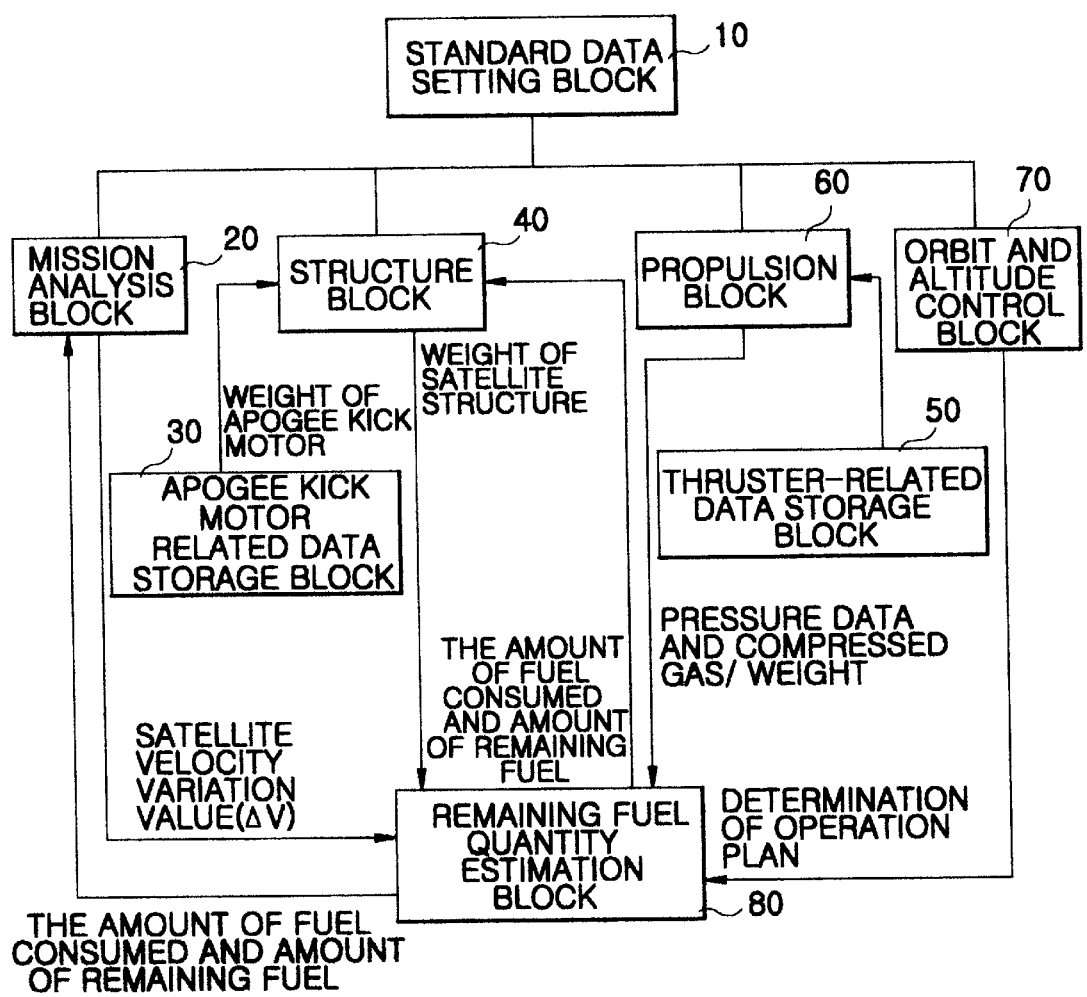
FIG. 1 is a block diagram of a system for estimating the amount of fuel in a GEO communication satellite according to the present invention.

FIG. 1 is a block diagram of a system for estimating the amount of fuel remaining in a satellite according to the present invention. Referring to FIG. 1, the system includes: a standard setting block 10 for setting standard data required for the propulsion system requirement specification of a communication satellite; a mission analysis block 20 for providing satellite velocity variation in accordance with the periodical position control in the direction of south/north and east/west with regard to sun and moon ephemeris, based upon the standard required for the communication satellite propulsion system, the amount of fuel consumed and the amount of remaining fuel; an apogee kick motor-related data storage block 30 for providing data associated with apogee kick motor, and the weight of apogee kick motor; a structure block 40 for providing the weight of apogee kick motor and weight of load among the weight of the satellite structure, which is required for the initial calculation, based on the standard required for the communication satellite propulsion system and the data from data storage block 30; a thruster-related data storage block 50 for storing thruster-related data; a propulsion block 60 for determining the initial amount of fuel loaded in the satellite structure and the weight of the compressed gas used to oxidize the jet fuel, based on the standard required for the communication satellite propulsion system, thruster-related data, the amount of fuel consumed, and amount of remaining fuel; an orbit and altitude control block 70 for determining an operation plan required for the mission fulfillment of the satellite through a variety of analysis procedures, based upon the standard required for the communication satellite propulsion system; and a remaining fuel quantity estimation block 80 for sending the amount of fuel consumed and amount of fuel remaining in a storage tank to mission analysis block 20 and structure block 40, which are computed using the satellite velocity variation from mission analysis block 20, the weight of the satellite structure from structure block 40, pressure data and compressed gas' weight from propulsion block 60, and data about the operation plan determined by orbit and altitude control block 70, and for computing and estimating the amount of remaining fuel by performing the aforementioned procedure at every operation.

According to the present invention constructed as described above, the blocks are connected to the satellite propulsion system, and transmit/receive data required to/from one another. Orbit and altitude control block 70 determines an operation plan required for performing the satellite mission through various analysis procedures, and provides it to remaining fuel quantity estimation block 80. Mission analysis block 20 provides the satellite velocity variation in accordance with periodical position control in the direction of south/north and east/west with regard to the sun and moon ephemeris.

Structure block 40 provides the weight of apogee kick motor and weight of the load among the weight of the satellite structure, which is required for the initial computation. Here, propulsion block 60 determines the initial amount of fuel loaded in the satellite structure and weight of the compressed gas used to oxidize and jet the fuel. Based on these data, data corresponding to the amount of fuel consumed and the amount of fuel remaining in the tank, which are calculated in remaining fuel quantity estimation block 80, are sent to mission analysis block 20 and structure block 40. By performing this procedure at every operation, a desired value is computed.

Figure 2:
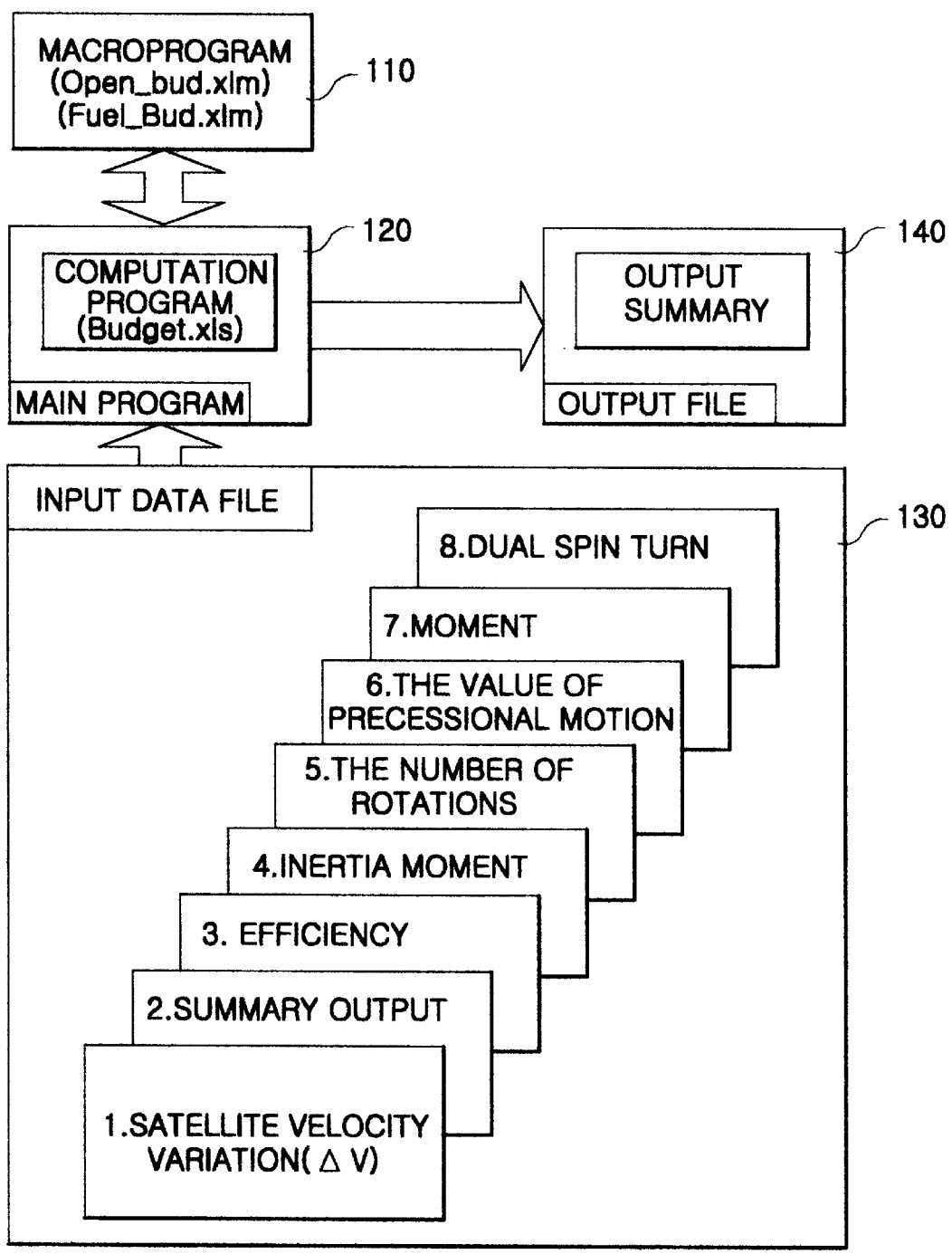
FIG. 2 shows an internal input/output file configuration of a block for estimating the amount of fuel remaining in a GEO communication satellite according to the present invention.

FIG. 2 illustrates the internal configuration of the remaining fuel quantity estimation block, which shows an input/output file configuration. The software for remaining fuel quantity estimation block 80 is made up in Exel environment executed in a PC. Though the parameters of initial input files vary with the physical characteristics of the satellite, the present invention uses the parameter of a satellite in the geostationary orbit. Referring to FIG. 2, a control section 110 controls the calculation of remaining fuel quantity according to two macroprograms which execute file opening and automation of computation in the entire software. The remaining files are designed to construct an input data section 130, an output section 140 for displaying a calculation result by annual parameter of operation plan table of the main program, and a computation section 120 executed by the main program which computes and estimates the remaining fuel quantity according to a computation program.

The first macroprogram (Open_bud.xlm) file of control section 110 sequentially opens all input/output files and connects them to one another, to allow all the files to share data. The second macroprogram (Fuel_bud.xlm) file selects a kind of thruster used in operation of the satellite, and provides the specific impulse value to computation program (Budget.xls) file, which is the main program of computation section 120. Input data section 130 includes files by parameters, which are physical parameters applied to each operation, to simplify the analysis of effect resulted from the change of satellite mission. For example, the input data are divided by parameters, such as satellite velocity variation, summary output, efficiency, momentum of inertia, the number of rotations, the value of precession motion, moment, and dual spin turn, and forms the input data file.

The computation program (Budget.xls) file, the main program of computation section 120, reads all input file data in input data section 130, performs operation according to a specific algorithm, and arranges the read data and computed data. Here, the result computed finally is displayed on output section 140 together with summary (Summary.xls) file, according to a predetermined format. The output of the computed data is displayed by annual parameter of operation plan table of the main program.

Figure 3:
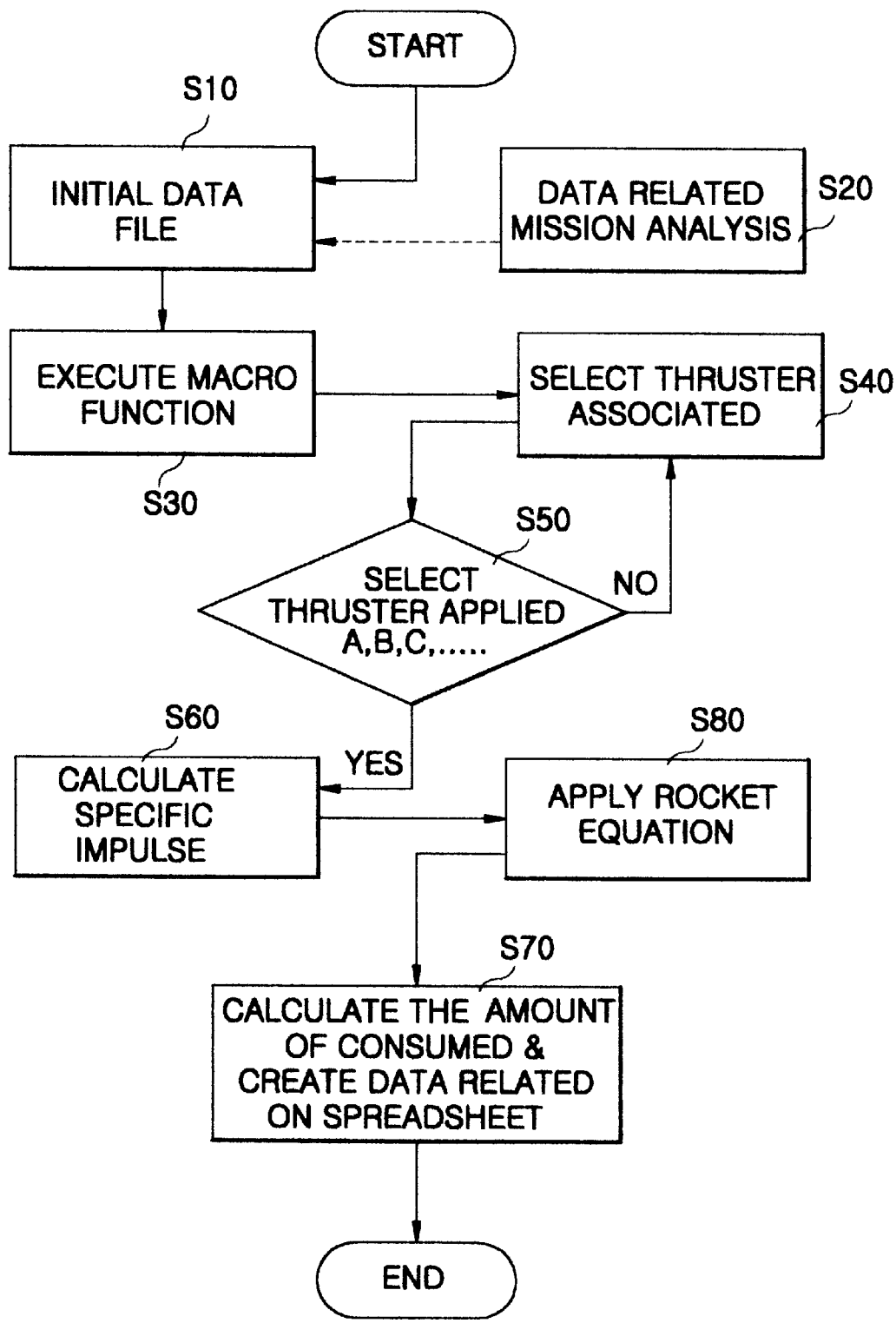
FIG. 3 is a flow diagram showing the process of data in the calculation of remaining fuel quantity in a GEO communication satellite according to the present invention.

FIG. 3 is a flow chart of a software for computing the fuel quantity, which shows a function of calculating the fuel quantity. Referring to FIG. 3, first of all, an operator receives desired data from mission analysis block 20 and structure block 40 (S10), and creates the initial input file in input section 130 (S20). Thereafter, the operator stores the created input file in such a manner that its file name is identical with the file name registered in the contents of the first macroprogram (Open_bud.xlm) file, and carries out macro (S30). Then, all input files are opened, and, in the second macroprogram (Fuel_bud.xlm) file, related thruster is selected (S40), to compute the specific impulse value (S60), through a logic loop (S50) which selects and determines a thruster to be applied to the satellite. When one satellite uses various kinds of thrusters, it is required to divide the operations and firing durations of the thrusters because the specific impulse value is a typical parameter for determining the efficiency of the thruster. The amount of fuel consumed is computed by using the rocket equation of computation (Budget.xls) file 120 of the main program (S70), and related data is created on spread sheet (S80).

As described above, the present invention provides the technique of estimating the amount of fuel remaining in the satellite structure, which is required for analyzing the satellite mission. The present invention simplifies the procedure of computing the fuel quantity of the satellite using commercially available Microsoft Exel, which easily processes related information. Furthermore, the present invention allows an unskilled operator to be able to easily process the input/output parameter required for yielding the fuel quantity. Moreover, the present invention has an advantage in automation of the computation procedure.

It will be apparent to those skilled in the art that various modifications and variations can be made in the apparatus and method for estimating the remaining fuel quantity in a satellite propulsion system of the present invention without departing from the spirit or scope of the invention. Thus, it is intended that the present invention covers the modifications and variations of this invention provided they come within the scope of the appended claims and their equivalents.

What is claimed is:

1. An apparatus for estimating amount of fuel remaining in a GEO (Geostationary Earth Orbit) communication satellite propulsion system, the apparatus comprising:

a standard setting block for setting standard data required for a propulsion system of a communication satellite;

a mission analysis block for providing satellite velocity value in accordance with periodical position control in horizontal and vertical directions with regard to sun and moon ophemer is, based upon the standard required for the communication satellite propulsion system, the amount of the fuel consumed and amount of remaining fuel;

an apogee kick motor-related data storage block for proving data associated with apogee kick motor, and weight of apogee kick motor;

a structure block for providing the weight of apogee kick motor and weight of load among weight of satellite structure, based on the standard required for the communication satellite propulsion system and the data supplied from data storage block, the satellite structure weight being required for initial computation;

a thruster-related data storage block for storing thruster-related data;

a propulsion block for determining initial amount of fuel loaded in the satellite structure, and weight of compressed gas used to oxidize and jet the fuel, based on the standard required for the communication satellite propulsion system, the thruster-related data, the amount of fuel consumed, and the amount of the remaining fuel;

an orbit and altitude control block for determining an operation plan required for performing a mission of the satellite, through a variety of analysis procedures, based upon the standard required for the communication satellite propulsion system; and a remaining fuel quantity estimation block for sending the amount of fuel consumed and the amount of fuel remaining in a storage tank to the mission analysis block and structure block, the amount of fuel consumed and the amount of the remaining fuel being calculated using the satellite velocity variation value supplied from the mission analysis block, the weight of the satellite structure supplied from the structure block, pressure data, and the compressed gas' weight supplied from the propulsion block, and data about the operation plan being determined by the orbit and altitude control block, the remaining fuel quantity estimation block being for performing the aforementioned procedure at every satellite operation, to compute and estimate the amount of the remaining fuel.

2. The apparatus as claimed in claim 1, wherein the remaining fuel quantity estimation block comprises:

a control section for controlling the calculation of remaining fuel quantity, according to two macroprograms which execute opening of file, and automation of computation in the entire software;

an input data section in which all input data exist as files, to simplify the analysis of effect resulted from the change of a satellite mission, the input data being divided by physical parameters which are applied to each satellite operation;

a computing section for reading data of all input files from the input data section, performing operations according to a specific algorithm based on the control of the control section and data supplied thereto, and carrying out computation according to a computation program which is a main program arranging the read data and computed data; and an output section for displaying the result, which is finally computed in the computation section, together with summary file, according to a predetermined format.

3. The apparatus as claimed in claim 2, wherein the control section controls the computation of remaining fuel quantity using a first macroprogram which sequentially opens all input/output files and connects them to allow them to share data, and second macroprogram which selects a kind of thruster used for the operation of satellite and provides a specific impulse value to the computation section executing the computation program of main program.

4. The apparatus as claimed in claim 2, wherein the input data section divides input data, such as satellite velocity variation value, summary output, efficiency, momentum of inertia, the number of rotations, the value of precession motion, moment, and dual spin turn, by parameters, the input data divided by parameters forming each input file.

5. A method for estimating amount of fuel remaining in a GEO (Geostationary Earth Orbit) communication satellite propulsion system, the method comprising the steps of:

receiving data regarding a satellite velocity variation value, and satellite structure weight from a mission analysis block and structure block, receiving pressure data, and data about weight of a compressed gas and operation plan, and dividing input data, according to a standard required for a communication satellite propulsion system, by parameters, to create the initial input file;

storing the created input file in such a manner that its file name is identical with a file name registered in contents of a first macroprogram, and executing the macroprogram, to open all input files;

calculating a specific impulsive value through a logic loop which selects and determines a thruster to be applied to the satellite, according to execution of a second macroprogram file; and computing amount of fuel consumed by applying rocket equation to a computation file of main program, creating related data on a spread sheet, and displaying a computed result together with an annual parameter summary file.

6. The method as claimed in claim 5, wherein the step of computing the specific impulse value is performed in such a manner that, when one satellite uses various kinds of thrusters, the specific impulse is computed for each thruster, with firing duration divided for each thruster.

7. The method as claimed in claim 5, wherein the step of displaying the data includes displaying based on annual parameter of operation plan table of the main program.

* * * * *